(12) United States Patent
Schlarman et al.

(10) Patent No.: US 8,662,474 B2
(45) Date of Patent: Mar. 4, 2014

(54) COMBINATION BEARINGS HAVING IMPROVED LOAD CAPACITIES AND LIFESPAN AND VALVE ASSEMBLIES INCLUDING THE SAME

(75) Inventors: Chris Schlarman, Chandler, AZ (US); Brent Bristol, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 69 days.

(21) Appl. No.: 13/021,250

(22) Filed: Feb. 4, 2011

(65) Prior Publication Data
US 2012/0199777 A1 Aug. 9, 2012

(51) Int. Cl.
*F16K 1/22* (2006.01)
*F16C 19/54* (2006.01)

(52) U.S. Cl.
USPC ............ 251/305; 384/453; 384/454; 384/455

(58) Field of Classification Search
USPC .......... 251/304, 305, 306, 307; 384/452, 453, 384/454, 455, 126–128, 456, 458, 490, 384/494–497, 618–623
See application file for complete search history.

(56) References Cited

U.S. PATENT DOCUMENTS

| | | | | |
|---|---|---|---|---|
| 812,756 A | * | 2/1906 | Lea et al. | 384/453 |
| 956,587 A | | 5/1910 | Lockwood | |
| 1,351,754 A | * | 9/1920 | Hubard | 384/494 |
| 2,118,760 A | * | 5/1938 | Ernst | 384/455 |
| 2,839,343 A | * | 6/1958 | Bensch | 384/454 |
| 2,934,312 A | * | 4/1960 | Stevens | 251/283 |
| 4,109,977 A | * | 8/1978 | Stephan | 384/454 |
| 4,223,961 A | * | 9/1980 | Martinez | 384/452 |
| 4,469,381 A | * | 9/1984 | McGuffie | 384/453 |
| 5,829,890 A | * | 11/1998 | Bauer et al. | 384/455 |
| 6,508,437 B1 | | 1/2003 | Davis et al. | |
| 6,926,446 B2 | | 8/2005 | Grehn et al. | |
| 7,427,163 B2 | | 9/2008 | Schoder et al. | |

(Continued)

FOREIGN PATENT DOCUMENTS

| DE | 1879514 | 9/1963 |
|---|---|---|
| DE | 19631437 A1 | 2/1998 |
| DE | 20007849 U1 | 5/2000 |

OTHER PUBLICATIONS

EP Search report, EP 11178893.1-2422 dated Mar. 19, 2012.

(Continued)

*Primary Examiner* — Stephen M Hepperle
*Assistant Examiner* — Hailey K Do
(74) *Attorney, Agent, or Firm* — Ingrassia Fisher & Lorenz, P.C.

(57) ABSTRACT

Embodiments of a combination bearing are provided, as are embodiments of a valve assembly including a combination bearing. In one embodiment, the valve assembly includes a flowbody having a flow passage therethrough, a drive shaft rotatably mounted within the flowbody, a valve element mounted to the drive shaft and positioned within the flow passage, and a combination bearing coupled between the flowbody and the drive shaft. The combination bearing comprises an integral radial load/thrust ring coupled to the drive shaft, and a thrust washer substantially adjacent the integral radial load/thrust ring, as taken along the longitudinal axis of the combination bearing. An outer radial ring circumscribes the integral thrust/radial load ring. A first plurality of rolling elements is captured between the thrust washer and the integral radial load/thrust ring, and a second plurality of rolling elements is captured between the outer radial ring and the integral radial load/thrust ring.

19 Claims, 4 Drawing Sheets

(56) References Cited

U.S. PATENT DOCUMENTS

| | | | |
|---|---|---|---|
| 7,703,746 B2* | 4/2010 | Habibvand | 251/306 |
| 2003/0052296 A1* | 3/2003 | Minegishi | 251/305 |
| 2006/0214128 A1* | 9/2006 | Horner et al. | 251/305 |
| 2009/0016658 A1 | 1/2009 | Habibvand | |
| 2009/0208160 A1* | 8/2009 | Wolf | 384/477 |
| 2010/0061672 A1* | 3/2010 | Dizlek et al. | 384/505 |
| 2010/0108932 A1 | 5/2010 | Bauer et al. | |
| 2010/0270489 A1 | 10/2010 | Mendoza et al. | |

OTHER PUBLICATIONS

EP Communication, EP 11178893.1-2422 dated Apr. 24, 2012.
EP Communication, EP 12 153 740.1 dated Mar. 19, 2013.
EP Search Report, EP 12 153 740.1 dated Apr. 25, 2012.
EP Office Action, EP 12 153 740.1 dated May 11, 2012.

* cited by examiner

COMBINATION BEARINGS HAVING IMPROVED LOAD CAPACITIES AND LIFESPAN AND VALVE ASSEMBLIES INCLUDING THE SAME

TECHNICAL FIELD

The present invention relates generally to rolling element bearings and, more particularly, to embodiments of a small-package combination bearing having superior radial and axial load capacities, as well as to embodiments of a valve assembly including such a combination bearing.

BACKGROUND

Butterfly-type valve assemblies are commonly utilized onboard aircraft to the control flow of highly pressurized fluids, such as bleed air. A butterfly valve assembly commonly includes a flowbody having a flow passage therethrough, a drive shaft rotatably suspended within the flowbody, and a valve plate disposed within the flow passage and mounted to the drive shaft. To provide a substantially uninterrupted sealing surface, the drive shaft may be angled with respect to the flow passage and with respect to a sealing member (e.g., a wiper seal) carried by the valve plate. Opposing ends of the suspended drive shaft are each received within a cylindrical recess or annulus provided within the flowbody, and a rolling element bearing is often disposed around each shaft end to facilitate rotation of the suspended drive shaft. The flowbody may also include various mounting features (e.g., flanges) to facilitate mounting to the aircraft ducting and to support a valve actuator, which engages an end portion drive shaft to provide controlled rotation of the valve plate during operation of the valve assembly.

As the pressure differentials across the butterfly valve plate increase, and as the dimensions of the valve plate increase, so too do the forces exerted on the valve plate by pressurized fluid within the flow passage. In the case of a butterfly valve assembly including an angled drive shaft, both radial and axial (thrust) forces are transferred through the drive shaft to the rolling element bearings. When conventional contact angle ball bearings are utilized to support an angled drive shaft subjected to high radial and axial (thrust) loading, undesirably high hertzian stress concentrations may occur within each ball bearing, which can result in excessive deformation and wear of the bearing's rolling elements and an overall reduction in the bearing's load-bearing capacity and operational lifespan. Dual bearing configurations, which pair one bearing dedicated to radial loads with a second, neighboring bearing dedicated to axial loads, can be employed to reduce the hertzian stresses within each bearing; however, the usage of two bearings to support a shaft end adds undesired bulk, weight, part count, and cost to the butterfly valve assembly. Combination bearings have also been developed that include two neighboring rows of rolling elements (e.g., a row of ball-type rolling elements and an adjacent row of rollers) separated by an annular guide flange. The row of ball-type rolling elements is typically intended to react to axial (thrust) loads, while the row of rollers is intended to react to the radial loads. However, due to limitations inherent in manufacturing processes, it is difficult to ensure precise alignment between the rotational centers of the neighboring rolling elements within the combination bearing. Movement of the ball-type rolling elements can thus become undesirably restricted during to rotation of the combination bearing due to internal misalignments, and the ball-type rolling elements may carry not only the axial (thrust) load, but also a substantial portion of the radial load. High concentrations of hertzian stress may thus occur within the ball-type rolling elements, again resulting in an undesired reduction in the bearing's load capacity and operational lifespan.

It would thus be desirable to provided embodiments of combination bearing that achieves improved load segregation between at least two rows of rolling elements to reduce the hertzian stress concentrations within the bearing and thereby improve the bearing's overall load capacity and operational lifespan. Ideally, embodiments of such a combination bearing would be relatively lightweight and compact and, consequently, well-suited for usage within valve assemblies utilized within avionic applications. Finally, it would further be desirable to provide embodiments of a valve assembly including such a combination bearing. Other desirable features and characteristics of the present invention will become apparent from the subsequent Detailed Description and the appended Claims, taken in conjunction with the accompanying Drawings and the foregoing Background.

BRIEF SUMMARY

Embodiments of a valve assembly, such as an airborne butterfly valve assembly, are provided. In one embodiment, the valve assembly includes a flowbody having a flow passage therethrough, a drive shaft rotatably mounted within the flowbody, a valve element mounted to the drive shaft and positioned within the flow passage, and a combination bearing coupled between the flowbody and the drive shaft. The combination bearing comprises an integral radial load/thrust ring coupled to the drive shaft, and a thrust washer disposed substantially adjacent the integral radial load/thrust ring, as taken along the longitudinal axis of the combination bearing. An outer radial ring circumscribes the integral thrust/radial load ring. A first plurality of rolling elements is captured between the thrust washer and the integral radial load/thrust ring, and a second plurality of rolling elements is captured between the outer radial ring and the integral radial load/thrust ring.

Embodiments of a combination bearing are further provided. In one embodiment, the combination bearing includes an integral radial load/thrust ring mounted to the drive shaft, and a thrust washer disposed substantially adjacent the integral radial load/thrust ring, as taken along the longitudinal axis of the combination bearing. An outer radial ring circumscribes the integral thrust/radial load ring. A first plurality of rolling elements is captured between the thrust washer and the integral radial load/thrust ring, and a second plurality of rolling elements is captured between the outer radial ring and the integral radial load/thrust ring.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The following describes exemplary embodiments of a combination bearing in the context of a particular type of valve assembly, namely, an airborne butterfly valve assembly. It is emphasized, however, that the following description is exemplary in nature and that embodiments of the combination bearing can be utilized within any application or device wherein it is desired to support a rotating component (e.g., a drive shaft) subjected to both radial and axial loads during operation.

Figure 1:
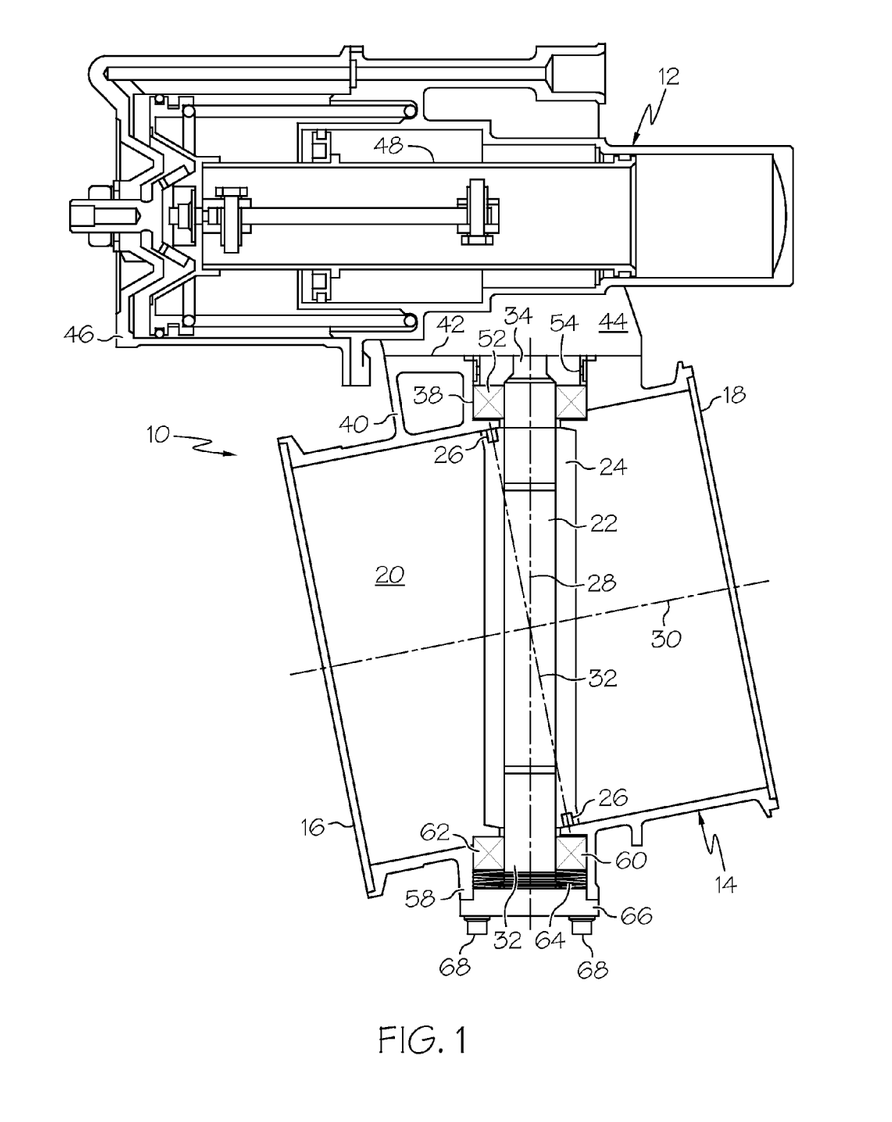
FIG. 1 is a cross-sectional view of a valve actuator and a butterfly valve assembly including an angled drive shaft supported by a rolling element bearing and a combination bearing in accordance with an exemplary embodiment of the present invention.

FIG. 1 is a cross-sectional view of a butterfly valve assembly 10 and a valve actuator 12 illustrated in accordance with an exemplary embodiment of the present invention. Butterfly valve assembly 10 includes a flowbody 14 having an outlet port 16, an inlet port 18, and a flow passage 20. An angled drive shaft 22 is rotatably suspended through flow passage 20, and a valve element (i.e., a butterfly valve plate 24) is mounted to an intermediate section of angled drive shaft 22. A wiper seal 26 is carried by butterfly valve plate 24 and sealingly engages the inner surface of flowbody 14 defining flow passage 20. Drive shaft 22 is mounted within flowbody 14 to accommodate relative thermal growth of shaft 22, as described more fully below. Drive shaft 22 is considered "angled" in that the longitudinal axis of drive shaft 22 (represented in FIG. 1 by dashed line 28) forms an acute angle with the longitudinal axis of flow passage 20 (represented in FIG. 1 by dashed line 30) of, for example, approximately 12 to 15 degrees. The longitudinal axis of drive shaft 22 also forms an angle with the plane in which wiper seal 26 is disposed (represented in FIG. 1 by dashed line 32). By angling drive shaft 22 in this manner, a substantially uninterrupted sealing surface is provided through the full range of motion of butterfly valve plate 24 and wiper seal 26. Flowbody 14 can include any number of structural elements, but is preferably fabricated (e.g., cast and machined) as a unitary piece to maximize structural integrity.

Drive shaft 22 includes an upper end portion 34 and an opposing, lower end portion 36. Upper end portion 34 of drive shaft 22 is received within a first cylindrical cavity 38 provided within flowbody 14 and, specifically, within an upper flowbody housing structure 40 extending radially from the main body of flowbody 14 in an upward direction. Upper flowbody housing structure 40 also includes an actuator mounting platform 42, which supports valve actuator 12 in the manner shown in FIG. 1. A linkage housing 44 may be disposed between actuator mounting platform 42 and valve actuator 12. Although not shown in FIG. 1 for clarity, linkage housing 44 contains a linkage (e.g., a bell-crank type linkage) mechanically coupling the piston of actuator 12 to upper end portion 34 of drive shaft 22. The particular form assumed by valve actuator 12 will inevitably vary amongst different embodiments. In the illustrated example, valve actuator 12 assumes the form of a pneumatic-type actuator, which includes a housing 46 and a pneumatic piston 48 slidably mounted within housing 46.

A combination bearing 52 and an annular spacer 54 are disposed within cavity 38 of upper flowbody housing structure 40. Combination bearing 52 is mounted around upper end portion 34 of angled drive shaft 22 and facilitates the rotation of shaft 22 relative to flowbody 14 during operation of butterfly valve assembly 10 and multi-dimensional loading of shaft 22 (described below). In the illustrated exemplary embodiment, combination bearing 52 is retained between the lower wall of annular spacer 54 and the floor of upper flowbody housing structure 40. Two exemplary manners in which combination bearing 52 may be implemented are described in detail below in conjunction with FIGS. 2-4.

Lower end portion 36 of angled drive shaft 22 is received within a lower flowbody housing structure 58, which extends radially from the main body of flowbody 14 in a downward direction. A cylindrical cavity 60 is provided within lower flowbody housing structure 58, and a rolling element bearing 62 is disposed within cavity 60. Rolling element bearing 62 is mounted around lower end portion 36 of angled drive shaft 22 to further facilitate rotation of shaft 22 in a loaded condition. At least one spring member 64 (e.g., a wave spring or a stack of Belleville washers) is positioned within cavity 60. Spring member 64 is compressed between a static component of combination bearing 52 (e.g., outer radial ring 78, described below) and the inner surface of a cover piece 66, which is affixed over the outer opening of flowbody housing structure 58 utilizing, for example, a plurality of fasteners 68. Spring member 64 exerts a preload on bearings 52 and 64 to prevent free axial movement of drive shaft 22. In particular, spring member 64 is sized to have a spring rate sufficient to prevent any appreciable longitudinal sliding of drive shaft 22 due to inertial and vibrational forces generated during aircraft acceleration and flight. At the same time, spring member 64 provides sufficient axial compliance to accommodate thermal growth of drive shaft 22 when heated by bleed air within flow passage 20.

Relatively high radial loads can be applied to drive shaft 22 and transmitted to combination bearing 52 and rolling element bearing 62 when significant pressure differentials develop across butterfly valve plate 24 and/or when the dimensions of butterfly valve assembly 10 are relatively large. Due to the orientation of valve plate 24 within flow passage 20, pressurized fluid within flowbody 14 may urge axial movement of drive shaft 22 away from rolling element bearing 62 and toward combination bearing 52 and valve actuator 12 (i.e., upward in illustrated orientation). As a result, significant axial (thrust) loads may also be imparted to combination bearing 52 during operation of valve assembly 10. Combination bearing 52 effectively segregates this multi-dimensional (radial and axial) load between two different rows of rolling elements, which are each adapted to carry their assigned load component. This results in a reduction in concentration of hertzian stress within the rolling elements and raceways of combination bearing 52, and allows combination bearing 52 to achieve radial and axial loading capacities and operational lifespans well exceeding those provided by conventional rolling element bearings (e.g., contact angle ball bearings). In addition, combination bearing 52 is relatively compact and lightweight and, consequently, does not add excessive bulk or weight to butterfly valve assembly 10. Two exemplary implementations of combination bearing 52 are described below in conjunction with FIGS. 2-4. While described below in the context of exemplary butterfly valve assembly 10, and therefore as positioned within annulus 38 of upper housing structure 40 and as receiving a thrust component in a generally upward direction, it will be understood that embodiments of combination bearing 52 can be utilized in various other types applications and may be utilized to react to thrust loads transmitted through bearing 52 in either longitudinal direction of bearing 52.

Figure 2:
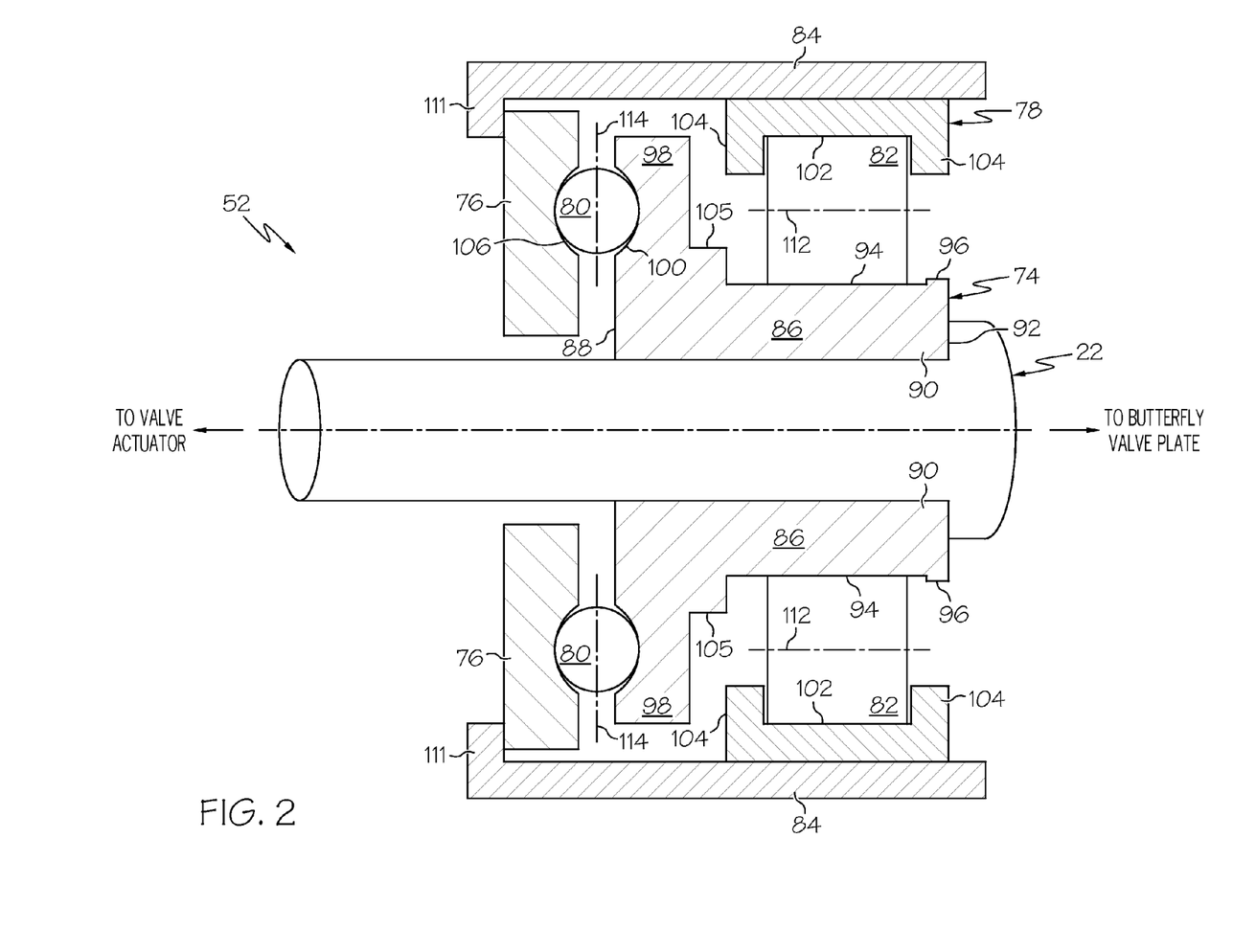
FIG. 2 is a cross-sectional view of the upper portion of the drive shaft and the exemplary combination bearing shown in FIG. 1.
Figure 3:
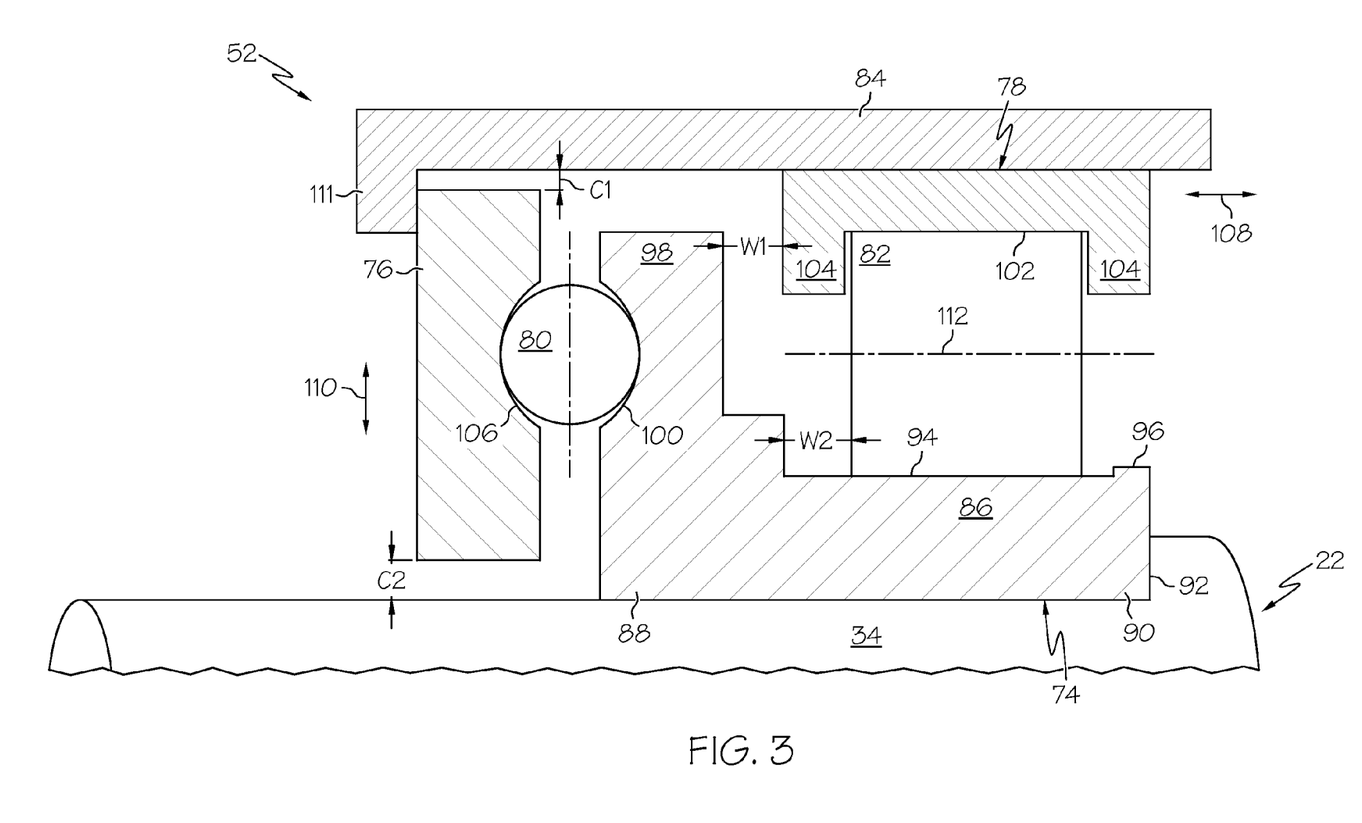
FIG. 3 is a more detailed cross-sectional view of a portion of the exemplary combination bearing shown in FIGS. 1 and 2.

FIG. 2 is a cross-sectional view of a portion of combination bearing 52 and upper end portion 34 of drive shaft 22 in accordance with an exemplary embodiment, and FIG. 3 is a more detailed cross-sectional view of combination bearing 52. Referring collectively to FIGS. 2 and 3, combination bearing 52 includes the following components: (i) an integral radial load/thrust ring 74 mounted around end portion 34 of drive shaft 22; (ii) a thrust washer 76 disposed adjacent integral radial load/thrust ring 74, as taken along the longitudinal axis of combination bearing 52; (iii) an outer radial ring 78 circumscribing integral radial load/thrust ring 74; (iv) a first plurality of rolling elements 80 captured between thrust washer 76 and integral radial load/thrust ring 74; (v) a second plurality of rolling elements 82 captured between outer radial ring 78 and integral radial load/thrust ring 74; and (vi) a bearing housing 84 containing integral radial load/thrust ring 74, thrust washer 76, outer radial ring 78, and rolling elements 80 and 82. In alternative embodiments, combination bearing 52 may include additional components, such as one or more annular guide members (e.g., a cage) adapted to maintain angular spacing between rolling elements 80 and/or rolling elements 82. The components of combination bearing 52 are each described, in turn, below.

In the illustrated example, integral radial load/thrust ring 74 includes a tubular body 86 having a first end portion 88 and a second, opposing end portion 90. Drive shaft 22 extends through integral radial load/thrust ring 74 and, specifically, through a longitudinal channel provided through tubular body 86. Tubular body 86 is piloted to shaft 22; e.g., as indicated in FIG. 2, drive shaft 22 may be fabricated (e.g., machined) to include an outer radial step 92, which abuts end portion 90 tubular body 86 when combination bearing 52 is assembled. As a result of this structural configuration, integral radial load/thrust ring 74 is fixedly coupled to drive shaft 22, and radial and axial (thrust) loads are both transferred through drive shaft 22 and to integral radial load/thrust ring 74 during operation of butterfly valve assembly 10 (FIG. 1). The foregoing notwithstanding, the particular manner in which integral radial load/thrust ring 74 is fixedly coupled to drive shaft 22 will vary amongst different embodiments; e.g., in certain embodiments, ring 74 may be indirectly coupled to drive shaft 22 via one or more intervening structural elements.

The outer annular surface of tubular body 86 defines an outer circumferential race 94 around integral radial load/thrust ring 74, which contacts and guides rolling elements 82 during rotation of ring 74 relative to outer radial ring 78. In the illustrated example, rolling elements 82 assume the form of cylindrical rollers, and outer circumferential race 94 is imparted with a substantially linear or flat cross-sectional geometry. The width of outer circumferential race 94 is greater than the widths of rolling elements 82, as taken along the longitudinal axis of combination bearing 52. Rolling elements 82 can thus slide along outer circumferential race 94 to accommodate axial movement of rolling elements 82 and outer radial ring 78 relative to integral radial load/thrust ring 74 (indicated in FIG. 3 by arrow 108). Axial displacement between rolling elements 82 and integral radial load/thrust ring 74 is, however, limited by a circumferential abutment shoulder 96, which is formed around terminal end 90 of tubular body 86 to prevent rolling elements 82 from departing outer circumferential race 94. Abutment shoulder 96 may comprise a series of circumferentially-spaced protuberances or castellations, but preferably assumes the form of a continuous annular rim formed around tubular body 86 of integral radial load/thrust ring 74.

Circumferential abutment shoulder 96 is preferably imparted with a sufficient radial height to reliably prevent sliding disengagement of rolling elements 82 from integral radial load/thrust ring 74, as previously described. However, the radial height of abutment shoulder 96 is preferably sufficiently limited to allow rolling elements 82 to be slid or otherwise positioned over shoulder 96 during assembly of combination bearing 52. Rolling elements 82 may be effectively slid over abutment shoulder 96 by a snap-fit action wherein shoulder 96 has a sufficient resiliency and geometry to temporarily deform or deflect to allow passage of rolling elements 82 with the application of force during assembly. Passage of rolling elements 82 over shoulder 96 may also be facilitated by heating outer radial ring 78 (possibly also in conjunction with rolling elements 82) to thermally expand ring 78 and thereby increase the inner diameter thereof. While outer radial ring 78 is in a heated, thermally-expanded state, rolling elements 82 may then easily be positioned along outer circumferential race 94 of integral radial load/thrust ring 74. Outer radial ring 78 is then allowed to cool and circumferentially engage the outer circumferential surfaces of rolling elements 82 thereby capturing elements 82 between ring 78 and ring 74. Further description of rolling element bearings including abutment shoulders and associated assembly methods can be found in co-pending U.S. application Ser. No. 12/411,260, entitled "ROLLER BEARING ASSEMBLIES AND ROLLER BEARING ASSEMBLY METHODS," filed on Mar. 25, 2009, the contents of which are hereby incorporated by reference.

An annular thrust collar 98 projects radially outward from first end portion 88 of tubular body 86. Annular thrust collar 98 is disposed axially adjacent thrust washer 76, but is axially offset therefrom by an axial gap or clearance. Collectively, annular thrust collar 98 and tubular body 86 impart integral radial load/thrust ring 74 with a substantially L-shaped cross-sectional geometry, as taken along a plane substantially orthogonal to the longitudinal axis of ring 74. An outer radial race 100 is provided around the outer radial face of thrust collar 98. During operation of combination bearing 52, rolling elements 80 travel along outer radial race 100 as integral radial load/thrust ring 74 rotates relative to thrust washer 76. In the illustrated example wherein rolling elements 80 assume the form of ball-type elements, and outer radial race 100 is imparted with an arced (e.g., semi-circular or semi-elliptical) cross-sectional geometry; however, rolling elements 80 may assume other forms in alternative embodiments (e.g., that of tapered rollers), and the cross-sectional profile of outer radial race 100 may vary accordingly. Annular thrust collar 98 is preferably, although not necessarily, integrally formed with tubular body 86 as a unitary piece.

Outer radial ring 78 circumscribes integral radial load/thrust ring 74 and is substantially concentric with tubular body 86. Outer radial ring 78 includes an inner circumferential race 102 and two guide shoulders 104, which extend radially inward from the annular body of ring 78. As does outer circumferential race 94, inner circumferential race 102 contacts and guides rolling elements 82 during rotation of integral radial load/thrust ring 74 relative to thrust washer 76. As rolling elements 80 assume the form of cylindrical rollers in the illustrated example, inner circumferential race 102 is imparted with a substantially linear of flat cross-sectional geometry. Rolling elements 82 are retained within inner circumferential race 102 by guide shoulders 104, which have an axial spacing slightly greater than the width of each rolling elements 82. Outer radial ring 78 is matingly received within bearing housing 84, but can slide axially therein (again, indicated in FIG. 3 by arrow 108) to accommodate relative axial movement of shaft 22 and integral radial load/thrust ring 74 due to thermal growth. As indicated above, outer radial ring 78 is prevented from slidably disengaging from bearing housing 84 by rolling elements 82, which are captured between guide shoulders 104 and which contact abutment shoulder 96 to provide a terminal hard stop prior to departure of elements 82 from inner circumferential race 94.

To prevent contact between outer radial ring 78 and annular thrust collar 98, integral radial load/thrust ring 74 may be fabricated to further include an annular spacing shoulder 105. As shown in FIGS. 2 and 3, annular spacing shoulder 105 projects radially outward from tubular body 86 between outer circumferential race 94 and the base of annular thrust collar 98. The width of annular spacing shoulder 105 (identified in FIG. 3 as $W_1$) is greater than the width of the innermost guide shoulder 104 of outer radial ring 78 (identified in FIG. 3 as $W_2$), as taken along the longitudinal axis of combination bearing 52. Due to this difference in longitudinal widths, in the event that longitudinal convergence should occur between rolling elements 80 and annular thrust collar 98, shoulder 105 will abut rolling elements 80 and arrest the sliding movement of outer radial ring 78 prior to contact of ring 78 with collar 98.

With continued reference to FIGS. 2 and 3, the inner radial face of thrust washer 76 defines an inner radial race 106, which contacts and guides rolling elements 80 during rotation of integral radial load/thrust ring 74 relative to thrust washer 76. As rolling elements 80 assume the form of ball-type elements in the illustrated example, inner radial race 106 is preferably imparted with an arced (e.g., semi-circular or semi-elliptical) cross-sectional geometry. Notably, thrust washer 76 is radially free floating within bearing housing 84. To permit free floating movement of thrust washer 76 (indicated in FIG. 3 by arrow 110), a first annular clearance is provided around the outer edge of thruster washer 76 and the interior of bearing housing 84 (identified in FIG. 3 as "$C_1$"), and a second annular clearance is provided around the inner edge of thrust washer 76 and drive shaft 22 (identified in FIG. 3 as "$C_2$"). Thrust washer 76 is retained within bearing housing 84 by abutment with an inner radial lip 111 provided around the interior of bearing housing 84.

As shown in FIGS. 2 and 3, bearing housing 84 preferably assumes the form of a discrete structural body, such as a cylindrical cartridge or casing, which may be matingly inserted into cavity 38 of upper flowbody housing structure 40 during assembly of butterfly valve assembly 10 (FIG. 1). However, it should be noted that, in alternative embodiments, combination bearing 52 may not include a discrete housing member and may instead to rely upon the walls of housing structure 40 defining cavity 38 (FIG. 1) to serve as the bearing housing. Stated differently, in certain embodiments, bearing housing 84 may be integrally formed with flowbody 14 (FIG. 1). In this case, the various components of combination bearing 52 (i.e., integral radial load/thrust ring 74, thrust washer 76, outer radial ring 78, and rolling elements 80 and 82) may be assembled directly within cavity 38.

Inner radial race 106 of thrust washer 76 and outer radial race 100 of annular thrust collar 98 collectively define an annular space or raceway in which rolling elements 80 travel and which is located axially adjacent integral radial load/thrust ring 74. Similarly, inner circumferential race 102 of outer radial ring 78 and outer circumferential race 94 of tubular body 86 define an annular space or raceway in which rolling elements 80 travel and which extends around or circumscribes integral radial load/thrust ring 74. The rotational axes of rolling elements 80 (represented in FIGS. 2 and 3 by lines 114) are substantially perpendicular to the rotational axis of integral radial load/thrust ring 74. Conversely, the rotational axes of rolling elements 82 (represented in FIGS. 2 and 3 by lines 112) are substantially parallel to the rotational axis of integral radial load/thrust ring 74 and perpendicular to rotational axes of rolling elements 80. The rotational axes of rolling elements 82 further extend through the raceway of rolling elements 80, as well as through rolling elements 80 when aligned with rolling elements 82.

As a result of above-described structural arrangement, axial (thrust) loads imparted to drive shaft 22 are primarily or exclusively transmitted through annular thrust collar 98 of radial load/thrust ring 74 to rolling elements 80, which are generally configured to movement in a radial direction; that is, rolling elements 80 are primarily reactant to the axial load component. In contrast, rolling elements 82 are able to slide in an axial direction along race 94 and, consequently, carry little to no portion of axial (thrust) loads transmitted through combination bearing 52. Radial loads imparted to combination bearing 52 are primarily or exclusively transmitted through tubular body 86 of inner radial load/thrust ring 74 and to rolling elements 82, which are generally confined to movement in an axial direction; that is, rolling elements 82 are primarily reactant to the radial load component. By comparison, rolling elements 80 are able to roll radially inward or outward from the axial centerline of combination bearing 52 to accommodate radial displacement between annular thrust collar 98 and thrust washer 76. Rolling elements 80 will thus self-align to rolling elements 82 during rotation of combination bearing 52 by continually moving toward radial positions at which the rotational axes of rolling elements 82 are substantially aligned with rolling elements 80. In this manner, the thrust-carrying portion of combination bearing 52 continually repositions to minimize or eliminate undesired sharing of the load components by rolling elements 80 and 82. In this manner, rolling elements 80 is subjected to little to no portion of the radial load transmitted through combination bearing 52, and a complete segregation of multi-dimensional (radial and axial) loads between rolling elements 80 and 82 is achieved. A homogenous distribution of mechanical stress is thus provided over the contact surfaces of rolling elements 80 and 82, which reduces stress concentrations within combination bearing 52 and enables a significant improvement in the overall load capacities and operational lifespan of bearing 52.

As indicated in FIGS. 2 and 3, rolling element bearings 82 preferably assume the form of a plurality of rollers and, specifically, cylindrical or non-tapered rollers. By selecting rollers for usage as rolling element bearings 82, the contact surface area over which radial loads are transmitted through rolling element bearings 82 can be maximized to further reduce stress concentrations therein. By comparison, rolling element bearings 80 are preferably selected to be either ball-type rolling elements or tapered (frustoconical) rollers. In embodiments wherein the axial (thrust) forces transmitted through combination bearing 52 are relatively low as compared to the radial forces transmitted therethrough, rolling element bearings 80 are preferably selected to be ball-type rolling elements, which are able to roll in a radial direction to accommodate relative radial movement between thrust washer 76 and annular thrust collar 98 with minimal friction. In the case of exemplary butterfly valve assembly 10 (FIG. 1), specifically, the axial (thrust) forces transmitted to combination bearing 52 will be considerably less than the radial forces transmitted to bearing 52 due to the relatively modest tilt of drive shaft 22 relative to the longitudinal axis of flowbody 14

(FIG. 1); for this reason, rolling elements bearings 80 are illustrated as ball-type rolling elements in FIGS. 2 and 3.

Figure 4:
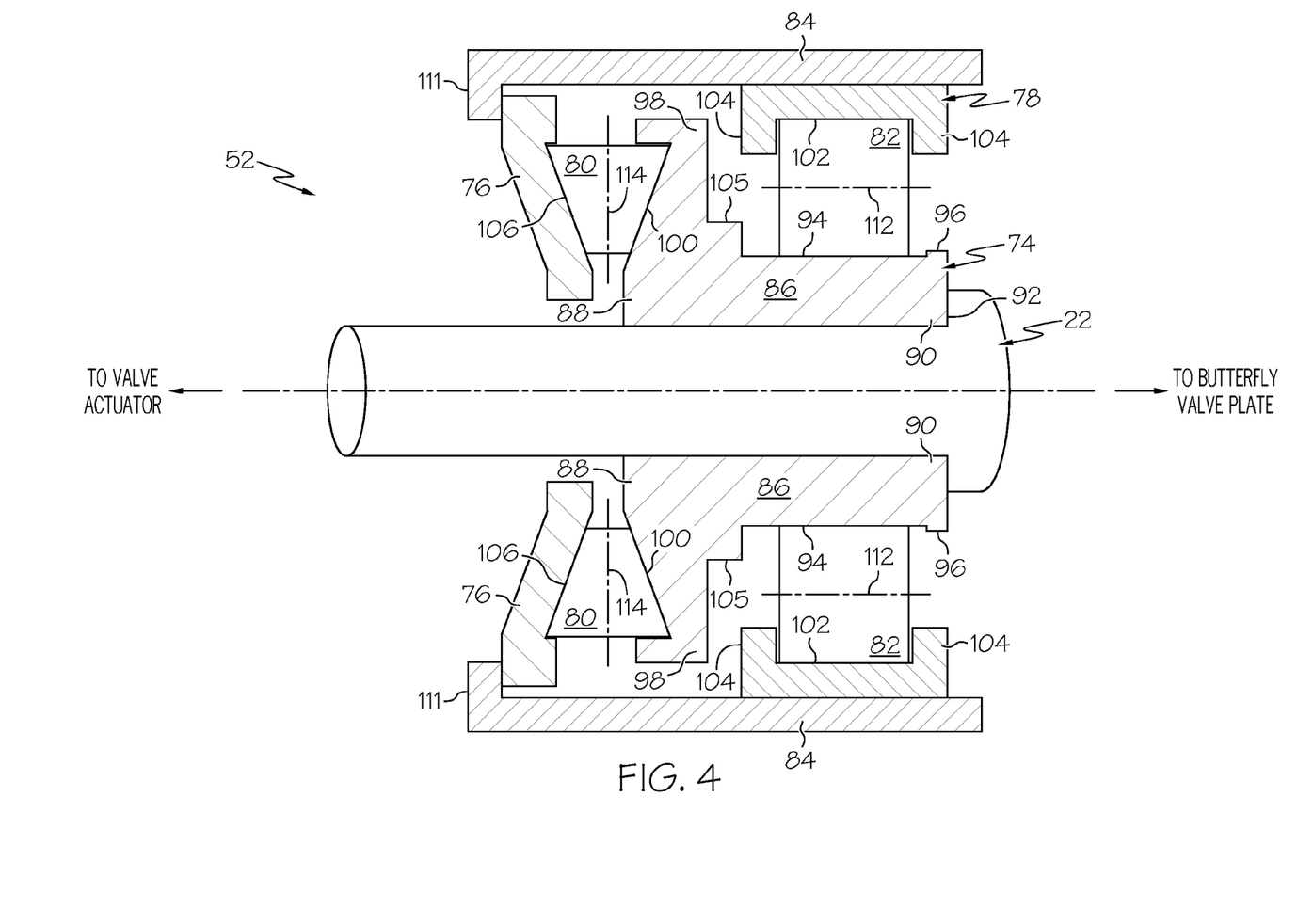
FIG. 4 is a cross-sectional view of a second exemplary combination bearing disposed around an end portion of a drive shaft and including a row of cylindrical roller-type elements through which radial loads are primarily transmitted and a row of tapered roller-type elements through which axial (thrust) loads are primarily transmitted.

In embodiments wherein the axial (thrust) forces approach or exceed the radial forces transmitted through bearing 52, rolling elements 80 preferably assume the form of tapered (frustoconical) rollers. Relative to ball-type rolling elements, tapered rollers provide a significantly enlarged contact surface area over which the radial loads can be distributed. In this regard, FIG. 4 illustrates an alternative embodiment of combination bearing 52 wherein rolling elements 80 assume the form of tapered rollers. As can be seen in FIG. 4, the geometries of thrust washer 76 and annular thrust collar 98 have been varied to support and retain tapered rollers 80. In addition, inner radial race 106 of thrust washer 76 and outer radial race 100 of annular thrust collar 98 have each been imparted with a substantially linear or flat cross-sectional geometry suitable for guiding tapered rollers 80 during rotation of integral radial load/thrust ring 74 relative to thrust washer 76.

There has thus been provided multiple exemplary embodiments of a combination bearing having superior axial and radial load bearing capacities and, consequently, an increased service life when utilized to support a suspended shaft subjected to both axial (thrust) and radial forces. Notably, combination bearings described above are relatively lightweight and compact and, therefore, well-suited for usage within an airborne valve, such as a butterfly valve assembly. As a primary advantage, in the above-described combination bearings, the rolling elements primarily reactant to the axial load component (e.g. rolling elements 80 shown in FIGS. 2-4) continually self-align to the rolling elements primarily reactant to the radial load component (e.g., rolling elements 82 shown in FIGS. 2-4) to maintain an optimal segregation of the load components between the two rows of rolling elements. More than two rows of rolling elements may be included in further embodiments of the combination bearing.

The foregoing has also described embodiments of a valve assembly (i.e., an airborne butterfly valve) including such a combination bearing. While, in the above-described exemplary embodiments, the valve assembly assumed the form of an airborne butterfly valve, it is emphasized that embodiments of the combination bearing can be utilized in conjunction with various other types of valves that include a rotating shaft to which a valve element is mechanically coupled, either directly or indirectly. More generally, embodiments of the above-described combination bearing can be utilized within any device or application wherein it is desired to support a rotating component, such as a drive shaft, that bears both axial (thrust) and radial loads.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A valve assembly, comprising:
    a flowbody having a flow passage therethrough;
    a drive shaft rotatably mounted within the flowbody;
    a valve element mounted to the drive shaft and positioned within the flow passage; and
    a combination bearing coupled between the flowbody and the drive shaft, the combination bearing comprising:
        an integral radial load/thrust ring coupled to the drive shaft;
        a thrust washer substantially adjacent the integral radial load/thrust ring, as taken along the longitudinal axis of the combination bearing;
        an outer radial ring circumscribing the integral thrust/radial load ring;
        a first plurality of rolling elements captured between the thrust washer and the integral radial load/thrust ring; and
        a second plurality of rolling elements captured between the outer radial ring and the integral radial load/thrust ring;
    wherein the integral radial load/thrust ring comprises:
        a tubular body through which the drive shaft extends;
        an annular thrust collar projecting radially outward from an end portion of the tubular body; and
        a circumferential abutment shoulder projecting radially outward from the tubular body and located between the second plurality of rolling elements and the annular thrust collar;
    wherein the second plurality of rolling elements and outer radial ring slide axially with respect to the integral radial load/thrust ring during operation of the combination bearing, and wherein the circumferential abutment shoulder comes into contact with the second plurality of rolling elements as the second plurality of rolling elements and the outer radial ring slide toward the annular thrust collar to prevent contact between the annular thrust collar and the outer radial ring.

2. A valve assembly according to claim 1 wherein the first plurality of rolling elements moves radially with respect to the longitudinal axis of the combination bearing to continually self-align with the second plurality of rolling elements during rotation of the combination bearing.

3. A valve assembly according to claim 1 wherein the integral radial load/thrust ring comprises an outer radial race, wherein the thrust washer comprises an inner radial race, and wherein the first-plurality of rolling elements is positioned between the outer radial race and the inner radial race.

4. A valve assembly according to claim 3 wherein the integral radial load/thrust ring further comprises an outer circumferential race, wherein the outer radial ring comprises an inner circumferential race, and wherein the second plurality of rolling elements is positioned between the outer circumferential race and the inner circumferential race.

5. A valve assembly according to claim 4 wherein the outer circumferential race has a width greater than the width of each of the second plurality of rolling elements, and wherein the second plurality of rolling elements slides along the outer circumferential race to accommodate relative axial movement between the integral radial load/thrust ring and the outer radial ring.

6. A valve assembly according to claim 1 wherein the rotational axes of the second plurality of rolling elements are substantially parallel with the rotational axis of the drive shaft.

7. A valve assembly according to claim 6 wherein the rotational axes of the first plurality of rolling elements are substantially perpendicular to the rotational axis of the drive shaft.

8. A valve assembly according to claim 1 wherein the second plurality of rolling elements comprises a plurality of rollers.

9. A valve assembly according to claim 8 wherein the first plurality of rolling elements is selected from the group consisting of a plurality of ball-type rolling elements and a plurality of tapered rollers.

10. A valve assembly according to claim 1 further comprising a bearing housing containing the integral radial load/thrust ring, the thrust washer, the outer radial ring, the first plurality of rolling elements, and the second plurality of rolling elements.

11. A valve assembly according to claim 10 wherein the thrust washer is radially free floating within the bearing housing.

12. A valve assembly according to claim 11 wherein a first annular clearance is provided around the outer circumferential sidewall of the thrust washer and an inner surface of the bearing housing, and wherein a second annular clearance is provided around the inner circumferential sidewall of the thrust washer and an outer surface of the drive shaft.

13. A valve assembly according to claim 1 wherein the drive shaft is angled with respect to the flowbody, and wherein the valve element comprises a butterfly valve plate.

14. A valve assembly according to claim 1 wherein the thrust washer is disposed substantially adjacent the annular thrust collar, as taken along the longitudinal axis of the combination bearing; wherein the outer radial ring circumscribes the tubular body; wherein the first plurality of rolling elements is captured between the thrust washer and annular thrust collar; and wherein the second plurality of rolling elements is captured between the outer radial ring and the tubular body.

15. A valve assembly according to claim 1 wherein the outer radial ring comprises an innermost guide shoulder having a first predetermined width, and wherein the circumferential abutment shoulder of the integral radial load/thrust ring has a second predetermined width greater than the first predetermined width.

16. A valve assembly, comprising:
a flowbody having a flow passage therethrough;
a drive shaft rotatably mounted within the flowbody;
a valve element mounted to the drive shaft and positioned within the flow passage; and
a combination bearing coupled between the flowbody and the drive shaft, the combination bearing comprising:
an integral radial load/thrust ring mounted to the drive shaft and having an annular thrust collar;
a first raceway partially defined by the integral radial load/thrust ring and located axially adjacent thereto;
a second raceway circumscribing the integral radial load/thrust ring;
a plurality of rollers positioned within the second raceway and primarily reactant to radial loads transmitted through the combination bearing;
a plurality of rolling elements positioned within the first raceway and primarily reactant to axial loads transmitted through the combination bearing; and
a radially-free floating thrust washer disposed axially adjacent the annular thrust collar and offset therefrom by an axial gap, as taken along the rotational axis of the combination bearing, the radially-free floating thrust washer having an inner radial face further defining the first raceway and contacting the plurality of rolling elements;
wherein the plurality of rolling elements and the annular thrust collar of the integral radial load/thrust ring are located between the radially-free floating thrust washer and the plurality of rollers.

17. A valve assembly according to claim 16 wherein the combination bearing further comprises:
an outer radial ring cooperating with the integral radial load/thrust ring to define the second raceway.

18. A valve assembly, comprising:
a flowbody having a flow passage therethrough;
a drive shaft rotatably mounted within the flowbody;
a valve element mounted to the drive shaft and positioned within the flow passage; and
a combination bearing coupled between the flowbody and the drive shaft, the combination bearing comprising:
a bearing housing having an inner radial lip;
an integral radial load/thrust ring mounted to the drive shaft, disposed within the bearing housing, and having an annular thrust collar;
an outer radial ring circumscribing the integral thrust/radial load ring;
a disk-shaped thrust washer disposed axially-adjacent the annular thrust collar and offset therefrom by an axial gap, as taken along the longitudinal axis of the combination bearing, and retained within the bearing housing by abutment with the inner radial lip;
a first plurality of rolling elements captured between the thrust washer and the integral radial load/thrust ring; and
a second plurality of rolling elements captured between the outer radial ring and the integral radial load/thrust ring.

19. A valve assembly according to claim 18 wherein the outer edge of the disk-shaped thrust washer is separated from the bearing housing by a first annular clearance and wherein the inner edge of the disk-shaped thrust washer is separated from the drive shaft by a second annular clearance such that the disk-shaped thrust washer is radially free floating within the bearing housing to enable the first plurality of rolling elements to continually move into radial positions the first plurality of rolling elements substantially align with the rotational axes of the second plurality of rolling elements.

* * * * *